3,225,092
PREPARATION OF AMIDES
Edward F. Zaweski, Oak Park, Mich., assignor to Ethyl Corporation, New York, N.Y., a corporation of Virginia
No Drawing. Filed May 8, 1963, Ser. No. 278,988
10 Claims. (Cl. 260—558)

This invention relates to a novel process for the preparation of amides.

It is an object of this invention to provide a process for the preparation of amides which comprise reacting ammonia or a primary or secondary amine with a metal carbonyl compound. A further object is to provide an amide synthesis comprising the reaction of a nitrogen derivative such as ammonia or a primary or secondary amine with an isonitrile chromium pentacarbonyl. Additional objects will be apparent from the following specification and claims.

The objects of this invention are accomplished by providing a process for the preparation of amides which comprises reacting a compound having the formula $HNR_1R_2$, wherein $R_1$ and $R_2$ are independently selected from the class consisting of hydrogen and hydrocarbon radicals having from one to eight carbon atoms, said radicals being free from hydrogen atoms which are more reactive than a hydrogen atom bonded to the nitrogen atom in said compound; with a reactant having the formula

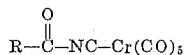

wherein R is a hydrocarbon radical having from 1 to about 16 carbon atoms.

A particularly preferred embodiment of this invention is a process for the preparation of an amide, said process comprising reacting a compound having the formula $HNR_1R_2$, wherein $R_1$ and $R_2$ are independently selected from the class consisting of hydrogen and hydrocarbon radicals having from 1 to about 8 carbon atoms, said radicals being selected from the class consisting of alkyl, aryl, cycloalkyl, alkaryl, aralkyl, and alkenyl radicals, with an acyl isonitrile chromium pentacarbonyl having the formula

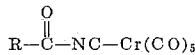

wherein R is a hydrocarbon radical having from 1 to about 16 carbon atoms, said radical selected from the class consisting of alkyl, cycloalkyl, aralkyl, aryl, alkaryl, alkenyl and cycloalkenyl radicals.

The isonitrile chromium pentacarbonyl compounds employed in this process are disclosed in a copending application filed in the name of Raymond E. Maginn on March 29, 1962, Serial No. 183,395, now U.S. 3,136,797, issued June 9, 1964. The contents of that disclosure are incorporated by reference herein as if fully set forth.

The radical R in the above formula can be selected from a wide variety of organic radicals; that is, they are composed solely of carbon and hydrogen.

Compounds which contain other groups attached to the carbon chain of the radical R are applicable. Hence, compounds such as chloropropionyl isonitrile chromium pentacarbonyl, p-aminobenzoyl isonitrile chromium pentacarbonyl, m-nitrobenzoyl isonitrile chromium pentacarbonyl and 5-hydroxyvaleryl isonitrile chromium pentacarbonyl are applicable in this invention.

The radical R in the above formula may be an alkyl radical having either a straight or branched chain. Non-limiting examples of this type of radical are the methyl, ethyl, isopropyl, amyl and 3-hexyldecyl radicals. Similarly, R may be an alkenyl radical such as the isopropenyl and 4-hexenyl radicals. R may contain two or more olefinic bonds. Radicals containing two olefinic bonds are the 1,3-pentadienyl radical and the like. R may contain one or more triple bonds.

R may be an alicyclic radical. Thus, for example, R may be a cyclohexyl or cyclopentyl radical. The alicyclic radical may contain olefinic bonds. Illustrative radicals of this type are the cyclopentenyl and 1,3-cyclohexadienyl radicals.

Furthermore, the cyclic radicals described and illustrated above may be substituted by aliphatic or aromatic substituents. Aralkyl radicals such as the phenylcyclohexenyl radicals and phenylcyclohexyl radicals are non-limiting examples of this type. Non-limiting examples of alkyl substituted alicyclic radicals are the ethylcyclohexyl, dimethylcyclohexyl and 1-methyl-3-cyclohexyl radicals.

Aralkyl radicals such as the β-phenylethyl and β-phenylbutyl radicals are also applicable.

R may also be a univalent aromatic radical. Non-limiting examples of applicable aromatic radicals are the phenyl, biphenylyl, naphthyl, 2,3-xylyl, and p-cumenyl radicals.

The exact structural configuration of the radical R is not critical. No limitation as to size or complexity of the radical has been found. However, the preferred radicals have one to about 16 carbon atoms. The most preferred radicals are those selected from the class consisting of alkyl, cycloalkyl, aralkyl, aryl, alkaryl, alkenyl and cycloalkenyl radicals. Compounds incorporating these radicals are preferred since they are more easily prepared and/or many of the amides prepared from these compounds have greater commercial utility.

Ammonia or any primary or secondary amine is applicable in the instant process provided that the organic radicals bonded to the nitrogen atom in the amine are free from hydrogen atoms which are more reactive than a hydrogen bonded to the nitrogen atom. Particularly preferred reactants are ammonia and the primary and secondary amines described and illustrated above.

Illustrative but not limiting examples of the primary amines, $H_2NR$, are methylamine, ethylamine, butylamine, cyclohexylamine, β-phenylethylamine, p-ethylaniline, and the like. Illustrative but non-limiting examples of the secondary amines which are applicable in this process include dimethylamine, diethylamine, methylethylamine, dicyclohexylamine, diphenylamine, di-2,4-dimethylphenylamine, and the like.

The process conditions are not particularly critical since the reactants need only be brought together at reaction temperatures. Agitation of the reaction mixture is helpful and the reaction may be carried out in an inert atmosphere or in air if desired. In many instances the isonitrile chromium pentacarbonyl is sufficiently soluble in the amine reactant to enable the process to be carried out without the use of a solvent. More than an equivalent quantity of amine can be employed, if necessary, to solubilize the isonitrile compound. Molar excesses of the amine reactant of from 2 to 100 moles or even higher can be employed. Frequently an excess of amine not only serves as a solvent, but by the Law of Mass Action, serves to force the reaction to afford higher yields of product.

In general, any non-reactive solvent can be used although in many cases a solvent is not necessary. Organic solvents are preferred. Typical inert solvents which may be employed are aliphatic hydrocarbons such as isooctane, nonane and the like, and hydrocarbon mixtures such as No. 9 oil and kerosene. Chlorinated solvents such as chloroform, carbon tetrachloride, trichloroethylene and the like can be employed if desired.

The process of this invention is effectively carried out at atmospheric pressure; however, in some instances, pressures as low at 10 mm. Hg or as high as 500 atmospheres can be employed if desired. Pressures from about atmospheric to 1000 p.s.i. are preferred.

The process is usually carried out at a temperature within the range of from 15° to 200° C. Higher or lower temperatures can be employed if desired. It is preferred that the temperature be sufficiently high to afford a reasonable rate of reaction, but not so high as to destroy the products or the reactants. The preferred temperature range is 25° to 100° C.

The time required is not a true independent variable but is dependent upon the other process variables employed. Generally, when high temperatures and agitation are employed, there will be a proportionate decrease in the reaction time. When the process of this invention is followed as illustrated by the above discussion and the following examples, reaction times in the order of one to 48 hours usually yield satisfactory results. The preferred reaction time is in the range of 5 to 10 hours. However, if it is desired, higher yields of products can be obtained in some instances if the reaction time is extended to from about 5 to about 10 days.

The products of the process of this invention can be readily separated from the reaction mixture by techniques familiar to a skilled practitioner. Applicable techniques include distillation, extraction, crystallization, chromatography and the like.

In the following examples, all parts are parts by weight unless otherwise noted.

Example I

Into a suitable autoclave equipped with heating means, stirring means, gas inlet and outlet means, and liquid inlet and outlet means, was charged a solution of 2.2 parts of benzoyl isonitrile chromium pentacarbonyl,

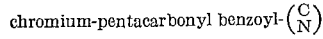

in 315 parts of tetrahydrofuran. The reaction vessel was charged at 44° C. with 50 p.s.i.g. of ammonia gas and then heated to about 100° C. Upon reaching 100° C., the pressure was 275 p.s.i.g. While stirring, the reaction mixture was maintained at 100° C. for four hours. Thereafter, the pressure vessel was cooled to about 16° C., vented and the reaction mixture discharged into a suitable distillation vessel. The reaction mixture was evaporatively distilled to remove the solvent. The residue, which was a reddish liquid, was distilled onto a cold finger at full vacuum pump pressure and at room temperature. A white solid sublimate appeared on the cold finger. The white solid was removed and sublimed at full vacuum pump pressure at around 95° C. Another white solid, melting point 130° C., deposited on the cold finger. This white solid, benzamide, had an infrared spectrum identical to that for an authentic sample of benzamide prepared by an independent route.

Similar results are obtained when the above procedure is followed except that isobutyryl isonitrile chromium pentacarbonyl is substituted for benzoyl isonitrile chromium pentacarbonyl. The product is isobutyramide, M.P. 128° C.

Example II

Following the procedure of Example I, isobutyryl isonitrile chromium pentacarbonyl is reacted at 50° C. with ammonia at 500 p.s.i.g. for two hours. Isobutyramide is obtained.

Similarly, when ethylamine is reacted at 100° C. and at 1,000 p.s.i.g., with a chloroform solution of isobutyryl isonitrile chromium pentacarbonyl, the product is N-ethylisobutyramide. When dimethylamine is reacted at 200° C. and at 500 p.s.i.g. with benzoyl isonitrile chromium pentacarbonyl, the product is N,N-dimethylbenzamide.

Example III

One mole of 2-methyl-3-cyclohexylpropionyl isonitrile chromium pentacarbonyl is reacted with 10 moles of n-butylamine at the reflux temperature of the system for six hours. The product is N-butyl-2-methyl-3-cyclohexylpropionamide.

Example IV

Aniline, 2 moles, dissolved in 100 moles of tetrahydrofuran, is reacted with 1 mole of 2-methyl-3-phenylpropionyl isonitrile chromium pentacarbonyl. The product is 2-methyl-3-phenylpropionanilide.

Example V

Cinnamoyl isonitrile chromium pentacarbonyl is reacted with β-phenylethylamine in kerosene at the reflux temperature of the system. The product is N-β-phenylethyl cinnamamide. Similarly, cinnamoyl isonitrile chromium pentacarbonyl reacts with aniline to yield cinnamanilide, M.P. 153° C.

Cinnamoyl isonitrile chromium pentacarbonyl and 3,5-dimethylaniline are reacted in a chloroform solution by refluxing for 8 hours to yield cinnam-3,5-dimethylanilide.

Example VI 3,5,3',5'-tetramethylbiphenoyl isonitrile chromium pentacarbonyl dissolved in nonane is reacted with dimethylamine at 200° C. and 50 p.s.i.g. for 8 hours. The product is N,N-dimethyl-3,5,3',5'-tetramethyl biphenylamide. Similarly, 15 moles of diethylamine dissolved in chloroform reacts with 3,5,3',5'-tetramethyl biphenoyl isonitrile chromium pentacarbonyl by refluxing the mixture to yield N,N-diethyl-3,5,3',5'-tetramethylbiphenylamide.

The amides produced by this process are useful as chemical intermediates. Many of them are useful as insecticides and herbicides and others are useful as medicinal products.

Having fully defined the novel compounds of this invention, their mode of preparation and their utility, I desire to be limited only within the lawful scope of the appended claims.

I claim:

1. Process for the preparation of an amide, said process comprising reacting a compound having the formula $$HNR_1R_2$$

wherein $R_1$ and $R_2$ are independently selected from the class consisting of hydrogen and hydrocarbon radicals having from one to eight carbon atoms, said radicals being free from hydrogen atoms which are more reactive than a hydrogen atom bonded to the nitrogen atom in said compound; with a reactant having the formula

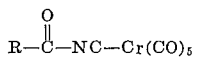

wherein R is a hydrocarbon radical having from 1 to about 16 carbon atoms.

2. Process for the preparation of an amide, said process comprising reacting a compound having the formula $NR_1R_2$, wherein $R_1$ and $R_2$ are independently selected from the class consisting of hydrogen and hydrocarbon radicals having from 1 to about 8 carbon atoms, said radicals being selected from the class consisting of alkyl, aryl, cycloalkyl, alkaryl, aralkyl, and alkenyl groups, with an acyl isonitrile chromium pentacarbonyl having the formula

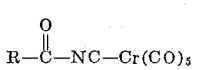

wherein R is a hydrocarbon radical having from 1 to about 16 carbon atoms, said radical selected from the class consisting of alkyl, cycloalkyl, aralkyl, aryl, alkaryl, alkenyl and cycloalkenyl groups.

3. The process of claim 2 being carried out at a temperature of from about 25 to about 250° C.

4. The process of claim 3 being carried out in the presence of an excess of said compound.

5. The process of claim 4 wherein said acyl isonitrile chromium pentacarbonyl is benzoyl isonitrile chromium pentacarbonyl.

6. The process of claim 4 wherein said acyl isonitrile chromium pentacarbonyl is isobutyryl isonitrile chromium pentacarbonyl.

7. A process for the preparation of benzamide, said process comprising reacting benzoyl isonitrile chromium pentacarbonyl with ammonia, under pressure.

8. The process of claim 7 being carried out in the presence of an inert organic solvent.

9. The process of claim 7 wherein said pressure is within the range of from 50 to 275 p.s.i.

10. The process of claim 8 wherein said inert organic solvent is tetrahydrofuran.

References Cited by the Examiner

Sidgwick: The Organic Chemistry of Nitrogen (textbook), pages 318–320 (1949), Taylor and Baker revision.

WALTER A. MODANCE, *Primary Examiner.*

NICHOLAS S. RIZZO, *Examiner.*